(12) United States Patent
Kubota

(10) Patent No.: US 9,630,444 B2
(45) Date of Patent: Apr. 25, 2017

(54) ROTATING-OPERATION TYPE OF WRITING TOOL

(71) Applicant: Kabushiki Kaisha Pilot Corporation, Chuo-Ku, Tokyo-To (JP)

(72) Inventor: Masaaki Kubota, Hiratsuka (JP)

(73) Assignee: Kabushiki Kaish Pilot Corporation, Tokyo (JP)

( * ) Notice: Subject to any disclaimer, the term of this patent is extended or adjusted under 35 U.S.C. 154(b) by 121 days.

(21) Appl. No.: 14/430,880

(22) PCT Filed: Sep. 20, 2013

(86) PCT No.: PCT/JP2013/075421
§ 371 (c)(1),
(2) Date: Mar. 24, 2015

(87) PCT Pub. No.: WO2014/046226
PCT Pub. Date: Mar. 27, 2014

(65) Prior Publication Data
US 2015/0239279 A1    Aug. 27, 2015

(30) Foreign Application Priority Data
Sep. 24, 2012 (JP) ................................. 2012-210006

(51) Int. Cl.
*B43K 7/12*     (2006.01)
*B43K 24/06*    (2006.01)
(Continued)

(52) U.S. Cl.
CPC ................ *B43K 24/06* (2013.01); *B43K 5/16* (2013.01); *B43K 5/17* (2013.01); *B43K 7/12* (2013.01);
(Continued)

(58) Field of Classification Search
CPC . B43K 24/06; B43K 5/16; B43K 5/17; B43K 7/12; B43K 8/24
(Continued)

(56) References Cited

U.S. PATENT DOCUMENTS 2,693,171 A    11/1954  Lanoie
2004/0253037 A1   12/2004  Noguchi et al.
(Continued)

FOREIGN PATENT DOCUMENTS

CH    257750 A    10/1948
CN    1672958 A    9/2005
(Continued)

OTHER PUBLICATIONS

Extended European Search Report in European Application No. 13838985.3, mailing date May 12, 2016, 8 pages.
(Continued)

*Primary Examiner* — Jennifer C Chiang
(74) *Attorney, Agent, or Firm* — Perkins Coie LLC

(57) ABSTRACT

When the rear axial cylinder (3) is rotated, the cam cylinder (17) is also rotated, thereby the cam protrusion (18a) moves forward by means of the functions of the cam groove (17a) and the slit (18b), so that the slider (18) moves forward to cause the writing body (14) to move forward against a biasing force by the biasing member (15). The cam cylinder (17) and the rear axial cylinder (3) are fixed via the adjustment mechanism of rotational positions (17n).

6 Claims, 10 Drawing Sheets

(51) Int. Cl.
    *B43K 8/24*     (2006.01)
    *B43K 5/16*     (2006.01)
    *B43K 5/17*     (2006.01)
    *F16H 25/18*     (2006.01)

(52) U.S. Cl.
    CPC ............. *B43K 8/24* (2013.01); *F16H 25/186* (2013.01); *Y10T 74/18568* (2015.01)

(58) Field of Classification Search
    USPC .................................................. 401/116, 108
    See application file for complete search history.

(56) References Cited

U.S. PATENT DOCUMENTS

| | | | |
|---|---|---|---|
| 2004/0265035 | A1 | 12/2004 | Brand et al. |
| 2005/0214057 | A1 | 9/2005 | Kato et al. |
| 2014/0241783 | A1* | 8/2014 | Niemeyer .............. B43K 24/06 401/232 |

FOREIGN PATENT DOCUMENTS

| | | |
|---|---|---|
| CN | 1771137 A | 5/2006 |
| CN | 101102908 A | 1/2008 |
| CN | 201105564 Y | 8/2008 |
| CN | 102529509 A | 7/2012 |
| DE | 3438074 A1 | 4/1986 |
| FR | 1438554 A | 5/1966 |
| FR | 2552027 A1 | 3/1986 |
| GB | 685706 A | 1/1953 |
| JP | H0273379 U | 6/1990 |
| JP | 03-142297 | 6/1991 |
| JP | 07-237394 | 9/1995 |
| JP | 2007-290220 | 11/2007 |
| JP | 2007-320209 | 12/2007 |
| JP | 2009-262409 | 11/2009 |
| JP | 2010194721 A | 9/2010 |

OTHER PUBLICATIONS

Chinese Office Action in Application No. 201380049623.1, mailing date Nov. 16, 2015, 13 pages, with English translation.
International Application No. PCT/JP2013/075421; International Search Report mailed Nov. 26, 2013; 2 pages; ISA/JPO.

* cited by examiner

Prior Art

ROTATING-OPERATION TYPE OF WRITING TOOL

This application is a U.S. National Stage Application of PCT/JP2013/075421 filed Sep. 20, 2013, which claims priority to Japanese Patent Application No. 2012-210006 filed Sep. 24, 2012. The entire contents of the above-identified applications are hereby incorporated by reference.

TECHNICAL FIELD

The present invention relates to a rotating-operation type of writing tool in which a front axial cylinder and a rear axial cylinder are separable and a tip portion of the writing tool is caused to protrude from a front portion of the front axial cylinder by a rotating operation of the rear axial cylinder.

BACKGROUND ART

Various kinds of rotating-operation types of writing tools have been conventionally known in which a front axial cylinder and a rear axial cylinder are separable and a tip portion of the writing tool is caused to protrude from a front portion of the front axial cylinder by a rotating operation of the rear axial cylinder. For example, JP 2007-320209 by the same applicant has disclosed an example of a rotating-operation type of writing tool in detail.

FIG. 9 is a sectional view of the rotating-operation type of writing tool disclosed in JP 2007-320209. This writing tool is a fountain pen 101 in which a tail crown 103 is arranged at a rear portion of a cylindrical body 102, and the cylindrical body 102 and the tail crown 103 form an entire cylinder 104. The cylindrical body 102 is formed by a front inner cylinder 105 and a rear inner cylinder, which are respectively covered (overlapped) by a front axial member 107 and a rear axial member 108, wherein the front inner cylinder 105 and the rear inner cylinder 106 are jointed to each other by a male screw portion 105a and a female threaded portion being threadably mounted on each other.

A hollow pipe 109 is mounted at a front portion of the front inner cylinder 105 of the cylindrical body 102. An elastic front-end member 110, which is made of a rubber, is mounted at a front portion of the hollow pipe 109. A lid 112 is arranged at an inclined front-end surface of the elastic front-end member 110 in such a manner that the lid 112 is closed by a snapping force of a torsion coil spring 111.

A coil portion 111a of the torsion coil spring 111 is pierced through by an axial rod 113 mounted on the hollow pipe 109. The axial rod 113 also pierces through winding-back portions 112, which are arranged at a lower end of the lid 112 so as to sandwich both sides of the coil portion 111a. Thus, the lid 112 can be opened and closed around the axial rod 113 serving as a fulcrum.

In addition, a bending-back portion 111b formed on a front-end side of the torsion coil spring 111 is engaged on an engaging portion 112b formed by bending an upper portion of the lid 112, and a rear arm portion 111c of the torsion coil spring 111 abuts on a side surface of the hollow pipe 109. Thus, the torsion coil spring 111 always biases the lid 112 toward the elastic front-end member 110.

A writing body 114, which has a structure of a fountain pen, is arranged in the cylindrical body 102. The writing body 114 has a pen body as a writing tip 114b at a front portion of a writing body base 114a, and an ink cartridge 114c containing ink for a fountain pen at a rear portion of the writing body base 114a.

A coil spring 115 is arranged between a step 114d formed at an intermediate portion of the writing body base 114a and a rear end portion 109a of the hollow pipe 109. The coil spring 115 has a function to always bias the writing body 114 rearward. A guide protrusion 114e provided on the writing body base 114a is loosely fitted (slidably fitted) into a slide groove 105b formed on an inside surface of the front inner cylinder 105. Thus, the writing body 114 can move forward and rearward without any rotation.

A female threaded portion 116a of a tail-crown inner cylinder 116 is threadably mounted on a male screw portion 106b formed at a rear end of the rear inner cylinder 106.

A cam cylinder 117 having a spiral cam groove 117a is arranged in the tail-crown inner cylinder 116. A male screw portion 117b of the cam cylinder 117 is threadably mounted on a female threaded portion 103a of the tail crown 103, thereby the cam cylinder 117 is rotatable integrally with the tail crown 103.

A pushing member 118 is arranged in the cam cylinder 117. A cam protrusion 118a having a shape like a head portion of a protruding pin is provided on a side surface of the pushing member 118. The cam protrusion 118a is loosely fitted in the cam groove 117a, and also loosely fitted in a slit 116b formed on the tail-crown inner cylinder 116 in a longitudinal direction thereof. In the example shown in FIG. 9, two pairs of the cam groove 117a and the slit 116b are provided axisymmetrically, and two cam protrusions 118a are provided correspondingly to them.

A flange 118b, whose diameter is larger, is provided at a front-end portion of the pushing member 118. A rear end of the ink cartridge 114c of the writing body 114 is caused to abut on the flange 118b. The coil spring 115 always biases the pushing member 118 rearward via the writing body 114, so that an O-ring 119 made of a rubber and mounted on a rear portion of the flange 118b is caused to abut on a jaw portion 106c formed on an inner surface of the rear inner cylinder 106. Thus, as shown in FIG. 9, under a situation in which the writing tip 114b has been caused to withdraw into the cylindrical body 102, the lid 112 abuts on the elastic front-end member 110 so that the front portion of the cylindrical body 102 assures airtightness, and the O-ring 119 abuts on the jaw portion 106c so that the rear portion of the cylindrical body 102 assures airtightness. Thus, as a result, the inside space of the cylindrical body 102 is closed sealingly.

Next, FIG. 10 shows a situation in which the writing tip 114b has been caused to protrude from the cylindrical body 102a.

When the tail crown 103 is rotated in a clockwise direction (in a direction shown by an arrow in FIG. 10), the cam cylinder 117 is also rotated in the clockwise direction integrally, which creates a force to rotate in the clockwise direction the cam protrusion 118a loosely fitted into the cam groove 117a of the cam cylinder 117. Herein, the cam protrusion 118a is also loosely fitted into the slit 116b of the tail-crown inner cylinder 116. Therefore, the cam protrusion 118a cannot be rotated in the clockwise direction. Instead, the cam protrusion 118a is slidably moved forward in the spiral cam groove 117a while being guided by the slit 116b.

Accordingly, the pushing member 118 is caused to move forward together with the cam protrusion 118a, so that the writing body 114 abutting on the pushing member 118 is also caused to move forward while compressing the coil spring 115. Subsequently, the writing tip 114b opens the lid 112, and the writing tip 114b protrudes from a front-end opening 107a formed at a front end portion of the front axial member 107.

After the writing tip 114b has protruded from the front-end opening 107a, the cam protrusion 118a of the pushing member 118 is held in a holding groove 117c provided adjacently to the cam groove 117a. Thus, the protruding condition of the writing tip 114b is maintained. The holding groove 117c is formed in a manner to go back a little in the axial direction of the cam cylinder 117 from the front end of the spiral cam groove 117a. Thereby, when the cam protrusion 118a is biased rearward in the holding groove 117c by the coil spring 115, the cam protrusion 118a is caught.

When the tail crown 103 is rotated in the opposite direction (anticlockwise direction) from the situation shown in FIG. 10, the cam protrusion 118a of the pushing member 118 is released from the holding groove 117c of the cam cylinder 117. Subsequently, by means of the elastic force of the coil spring 115, the cam protrusion 118a is subjected to a force in a direction opposite to that when the cam protrusion 118a has moved forward. Thus, the cam protrusion 118a moves rearward in the cam groove 117a while giving an opposite rotating force to the cam groove 117a. The pushing member 118 also moves rearward, and thus the writing body 114 that is biased by the coil spring 115 moves rearward, too. The impact that the writing body 114 may receive when the writing body 114 moves rearward is cushioned by the O-ring 119 mounted on the pushing member 118 abutting on the jaw portion 106c of the rear inner cylinder 106.

SUMMARY OF THE INVENTION

The rotating-operation type of writing tool based on the above described JP 2007-320209 has excellent performance, and thus a wide range of users are satisfied with the actual products thereof.

Herein, recently, there have been requested products wherein the tail crown 103 as a rotating-operation portion is made larger to have substantially the same size as that of the cylindrical body 102 as a front axial cylinder. Many of mechanics principles thereof are derivable from the above described JP 2007-320209. However, as a result of diligent study of persons involved in design development, the following problems have been pointed out.

As described above, in the rotating-operation type of writing tool according to JP 2007-320209, the female threaded portion 116a of the tail-crown inner cylinder 116, which has a cylindrical shape, is threadably mounted on the male screw portion 106b formed at the rear end of the rear inner cylinder 106 (a part of the cylindrical body 102 being the front axial cylinder), and the male screw portion 117b of the cam cylinder 117 is threadably mounted on the female threaded portion 103a of the tail crown 103 being the rear axial cylinder. Then, the relationship of rotational position (rotational phase) between the tail-crown inner cylinder 116 and the cam cylinder 117 is determined by positional relationship between the spiral cam groove 117 and the cam protrusion 118a.

Herein, the persons involved in design development have started to desire no difference in the rotational positions (rotational phases) of the design of the tail crown 103 being the rear axial cylinder and the design of the rear inner cylinder 106 being the front axial cylinder, both in the situation as shown in FIG. 9 wherein the writing tip 114b is contained and in the situation as shown in FIG. 10 wherein the writing tip 114b is protruded.

The total angle of the relative rotation between the tail crown 103 being the rear axial cylinder and the rear inner cylinder 106 being the front axial cylinder, from the situation as shown in FIG. 9 wherein the writing tip 114b is contained to the situation as shown in FIG. 10 wherein the writing tip 114b is protruded, can be precisely adjusted by adjusting positional relationship in the rotating direction of the front end and the rear end of the spiral cam groove 117.

Thus, in the situation as shown in FIG. 9 wherein the writing tip 114b is contained, if the design of the tail crown 103 being the rear axial cylinder and the design of the rear inner cylinder 106 being the front axial cylinder are adjusted to be precisely continuous with each other, the desire by the persons involved in design development may be satisfied.

However, the respective screw or threaded portions 106b, 116a, 103a, 117b are usually produced as cut parts, so that it is very difficult to adjust the rotational position of each of the screw or threaded portions (to adjust the rotational position when the screw or threaded portions have been fully threadedly engaged).

The present invention has been made in view of the above circumstances. The object of the present invention is to provide a rotating-operation type of writing tool in which the design of a rear axial cylinder and the design of a front axial cylinder can be easily made continuous with each other without any difference between rotational positions (rotational phases) thereof.

The present invention is a rotating-operation type of writing tool in which a tip portion of the writing tool is caused to protrude from a front portion of a front axial cylinder by a rotating operation of a rear axial cylinder with respect to the front axial cylinder, including: a front axial cylinder and a rear axial cylinder which are separable from each other; a rear-axial-cylinder inner cylinder provided in the rear axial cylinder and fixed to a rear portion of the front axial cylinder, the rear-axial-cylinder inner cylinder having a slit in a longitudinal direction thereof; a cam cylinder provided in the rear-axial-cylinder inner cylinder and fixed to the rear axial cylinder, the cam cylinder having a spiral cam groove; a cam protrusion loosely fitted into the cam groove of the cam cylinder and the slit of the rear-axial-cylinder inner cylinder; a slider provided in the cam cylinder, the slider being movable in the cam cylinder integrally with the cam protrusion; and a writing body provided in the front axial cylinder, the writing body being biased rearward by a biasing member relative to the front axial cylinder; wherein the slider is also biased rearward via the writing body by the biasing member; when the rear axial cylinder is rotated, the cam cylinder is rotated, thereby the cam protrusion moves forward by means of the cam groove and the slit, so that the slider moves forward to cause the writing body to move forward against a biasing force by the biasing member, and the cam cylinder and the rear axial cylinder are fixed via an adjustment mechanism of rotational positions.

According to the present invention, since the cam cylinder and the rear axial cylinder are fixed via the adjustment mechanism of rotational positions, a design of the rear axial cylinder and a design of the front axial cylinder can be made continuous with each other without any difference between rotational positions (rotational phases) thereof, by adjusting the rotational positions (rotational phases) of the cam cylinder and the rear axial cylinder, even when the front axial cylinder and the rear-axial-cylinder inner cylinder are threadedly engaged with each other so that it is very difficult to adjust their fixed rotational positions (rotational phases).

For example, the adjustment mechanism of rotational positions may include: a nut having a convex portion whose rotational position is adjustably fixed on the cam cylinder; and a positioning portion provided on the rear axial cylinder, configured to be fitted on the convex portion of the nut.

Alternatively, oppositely in convex and concave relationship, the adjustment mechanism of rotational positions may include: a nut having a concave portion whose rotational position is adjustably fixed on the cam cylinder; and a positioning portion provided on the rear axial cylinder, configured to be fitted into the concave portion of the nut. In these cases, the rotational position (rotational phase) of the rear axial cylinder and the rotational position (rotational phase) of the front axial cylinder can be adjusted by adjusting the rotational position of the convex portion or the concave portion of the nut with respect to the cam cylinder. In addition, in these cases, it is preferable that the adjustment mechanism of rotational positions has a male screw portion fixed on the cam cylinder and that the rotational position of the nut is adjustably fixed on the male screw portion.

According to the present invention, the design of the rear axial cylinder and the design of the front axial cylinder can be made continuous with each other very easily without any difference between rotational positions (rotational phases) thereof. Thus, it is possible to adopt substantially triangle-pole shapes as shapes for the front axial cylinder and the rear axial cylinder (see FIG. 3).

MODE FOR CARRYING OUT THE INVENTION

One embodiment of the present invention will be explained herebelow in detail with reference to the drawings.

Figure 1:
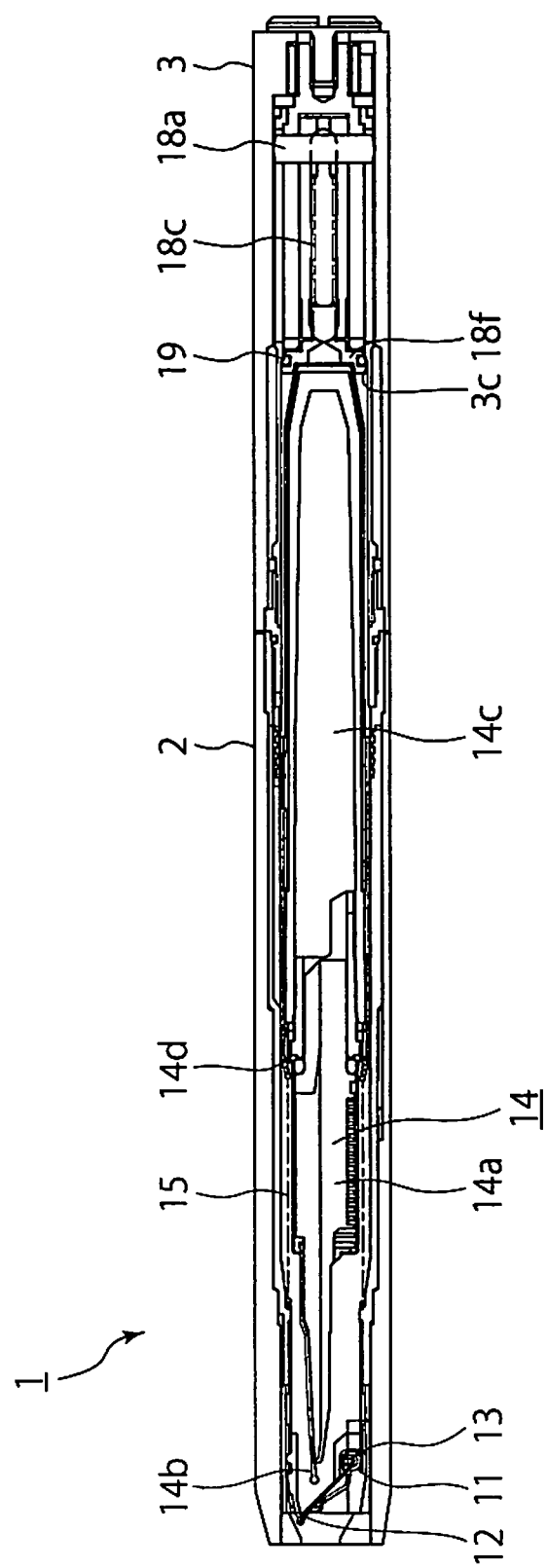
FIG. 1 is a schematic view showing a rotating-operation type of writing tool according to an embodiment of the present invention, under a situation wherein a writing body is contained.
Figure 2:
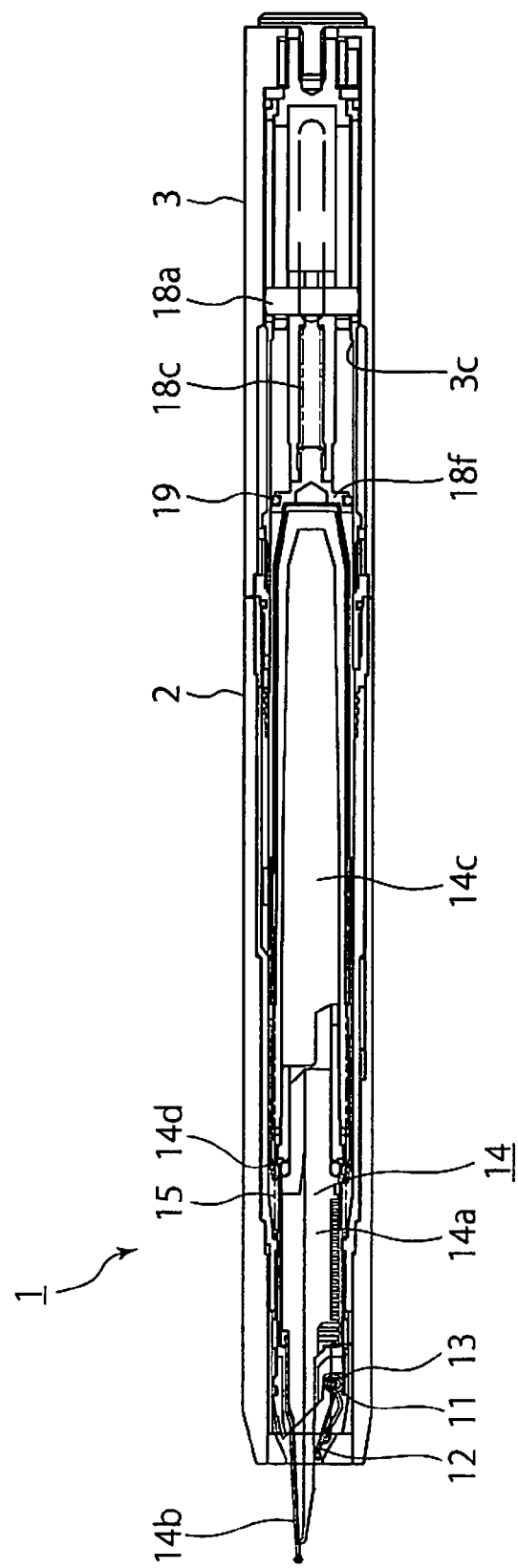
FIG. 2 is a schematic view showing the rotating-operation type of writing tool of FIG. 1, under a situation wherein the writing body is protruded.
Figure 3:
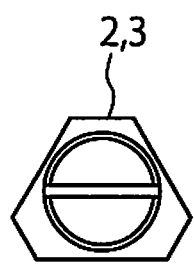
FIG. 3 is a rear view showing the rotating-operation type of writing tool of FIG. 1.

FIG. 1 is a schematic view showing a rotating-operation type of writing tool according to an embodiment of the present invention, under a situation wherein a writing body is contained. FIG. 2 is a schematic view showing the rotating-operation type of writing tool of FIG. 1, under a situation wherein the writing body is protruded. As shown in FIGS. 1 and 2, the rotating-operation type of writing tool is a fountain pen 1, which has a front axial cylinder 2 and a rear axial cylinder 3 which are separated from each other, as axial cylinders. FIG. 3 is a rear view showing the rotating-operation type of writing tool of FIG. 1. As shown in FIG. 3, the shapes of the front axial cylinder 2 and the rear axial cylinder 3 are substantially triangle-pole shapes.

As shown in FIGS. 1 and 2, a lid 12 is arranged at a front portion of the front axial cylinder 2 in such a manner that the lid 12 is closed by a snapping force of a torsion coil spring 11. A coil portion of the torsion coil spring 11 is pierced through by an axial rod 13. The lid 12 can be opened and closed around the axial rod 13 serving as a fulcrum. The torsion coil spring 11 always biases the lid 12 to a closed situation thereof.

A writing body 14, which has a structure of a fountain pen, is arranged in the front axial cylindrical 2. The writing body 14 has a pen body as a writing tip 14b at a front portion of a writing body base 14a, and an ink cartridge 14c containing ink for a fountain pen at a rear portion of the writing body base 14a.

A coil spring 15 is arranged between a step 14d formed at an intermediate portion of the writing body base 14a and the front axial cylinder 2. The coil spring 15 has a function to always bias the writing body 14 rearward. A guide protrusion (not shown) provided on the writing body base 14a is loosely fitted (slidably fitted) into a slide groove (not shown) formed on an inside surface of the front axial cylinder 2. Thus, the writing body 14 can move forward and rearward without any rotation.

Figure 4:
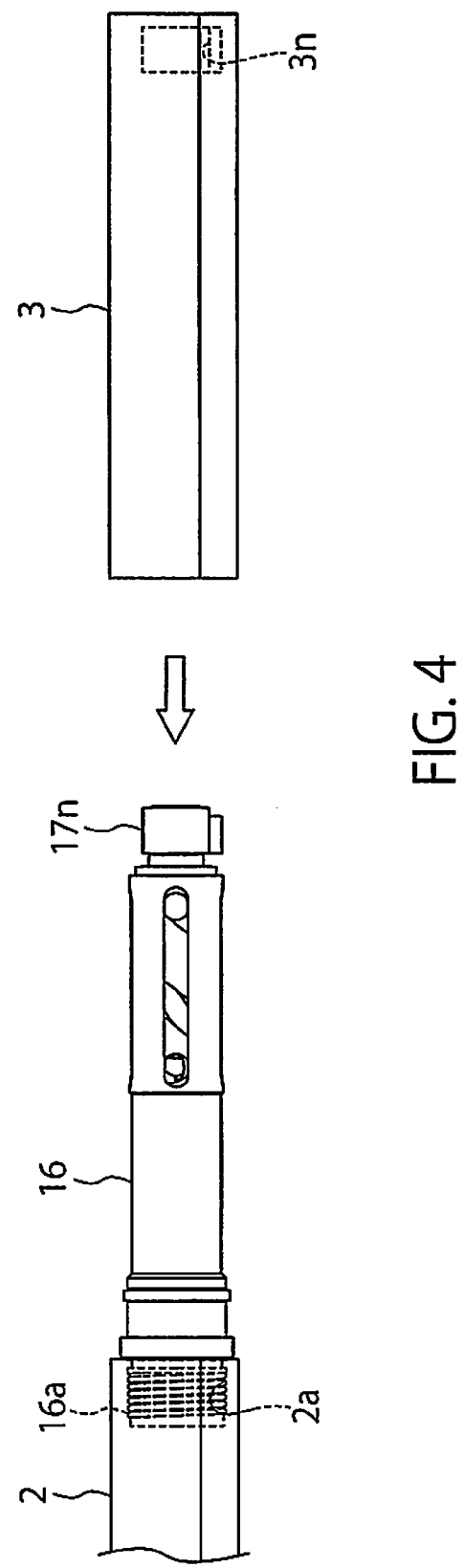
FIG. 4 is an explanatory view of an assembling step of a rear axial cylinder.
Figure 5:
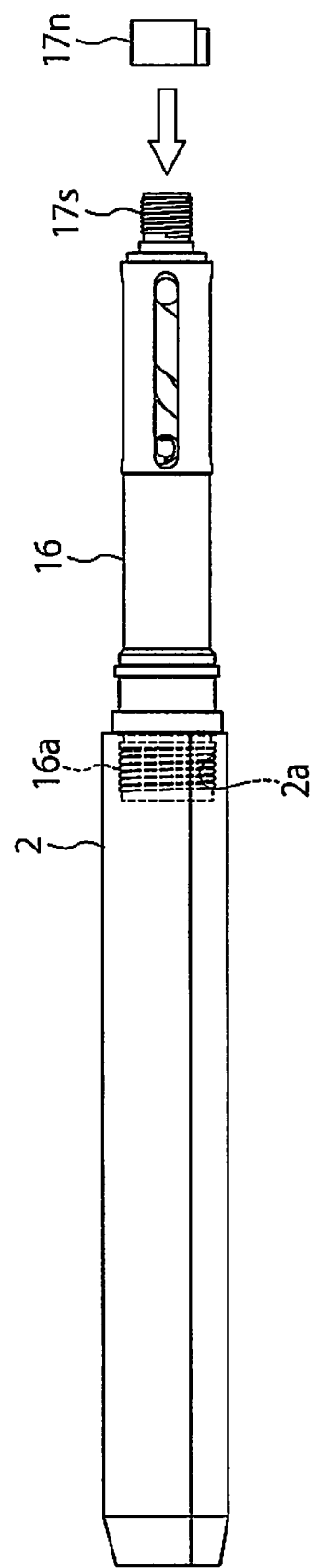
FIG. 5 is an explanatory view of an assembling step of a nut as an adjustment mechanism of rotational positions.
Figure 6:
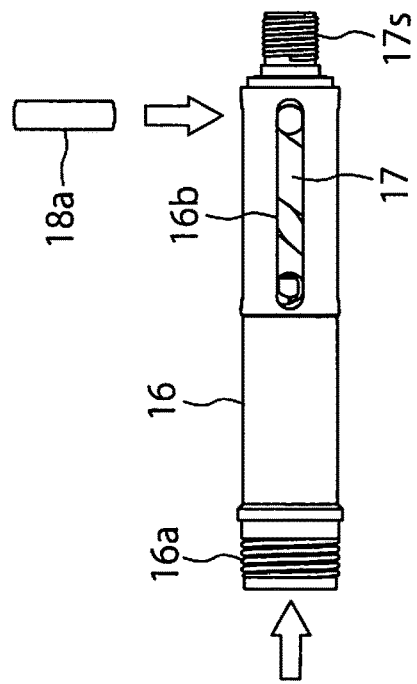
FIG. 6 is an explanatory view of an assembling step of a rear-axial-cylinder inner cylinder.
Figure 6:
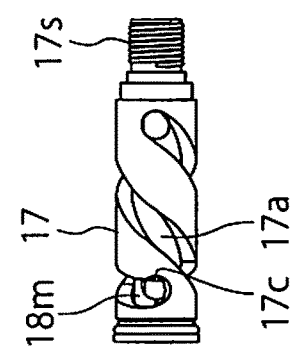
Figure 7:
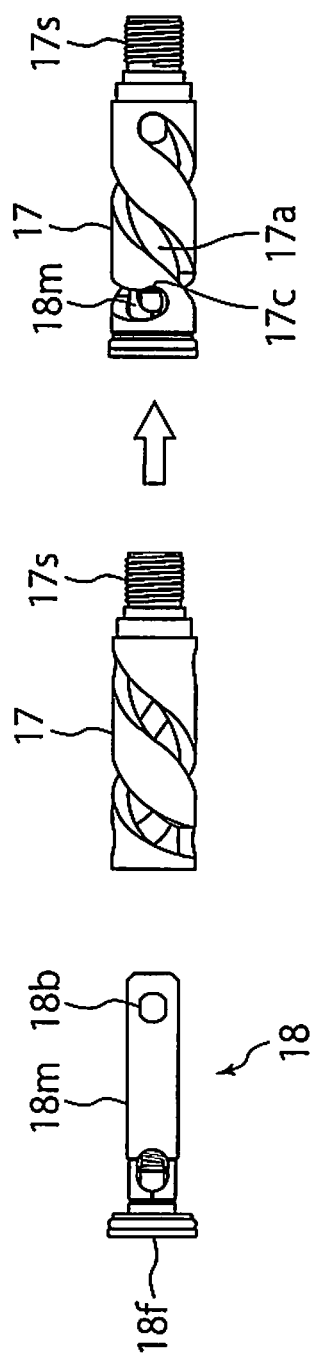
FIG. 7 is an explanatory view of an assembling step of a cam cylinder.
Figure 8:
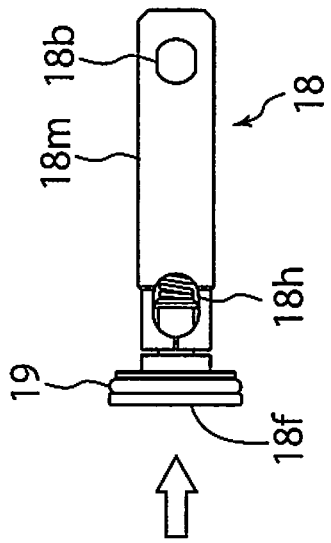
FIG. 8 is an explanatory view of an assembling step of a slider.
Figure 8:
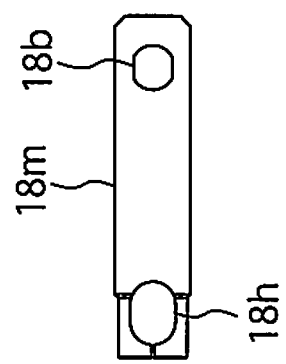
Figure 8:
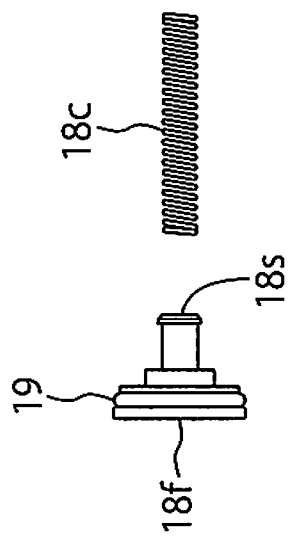
Figure 9:
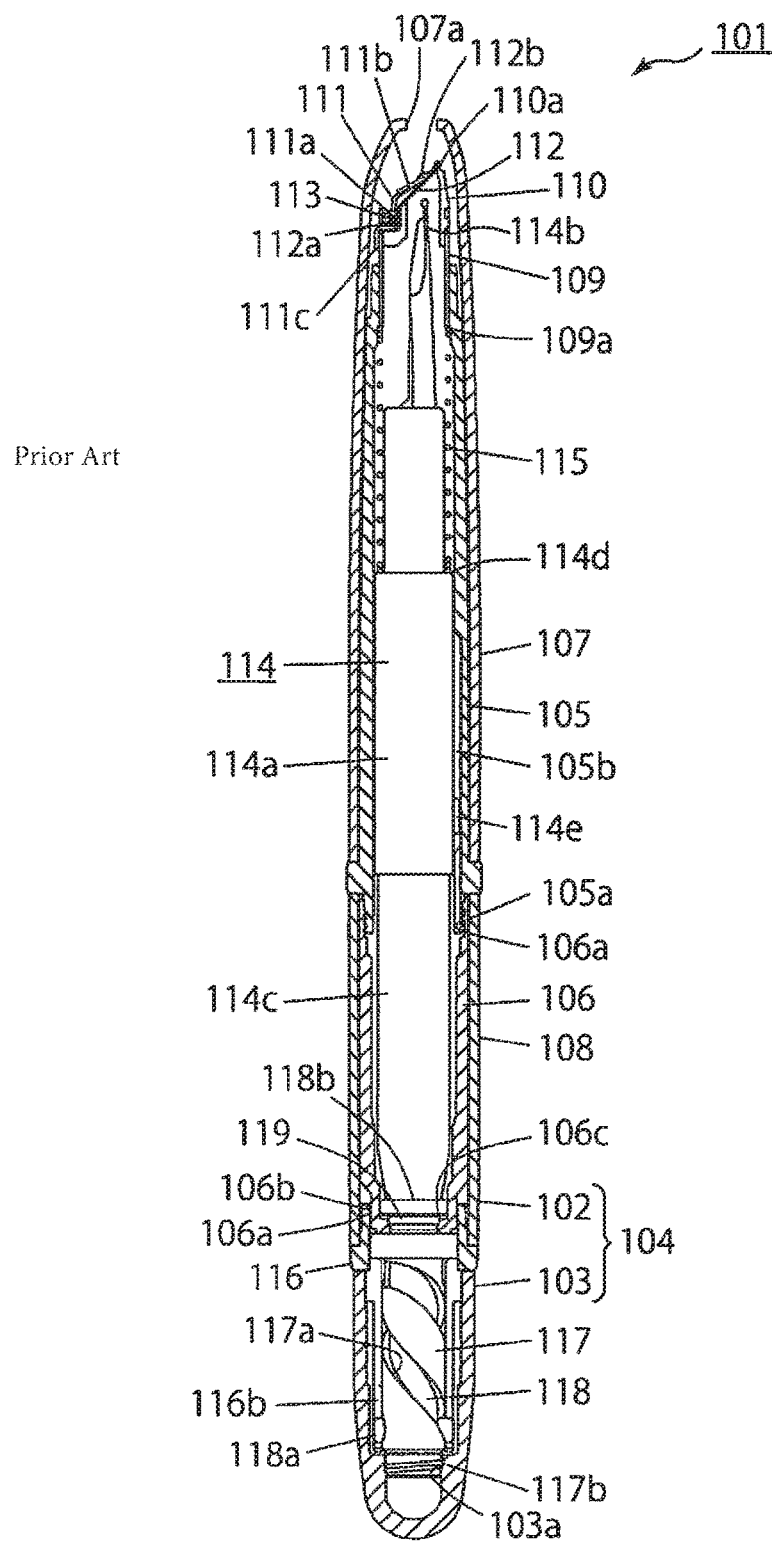
FIG. 9 is a schematic view showing a conventional rotating-operation type of writing tool, under a situation wherein a writing body is contained.
Figure 10:
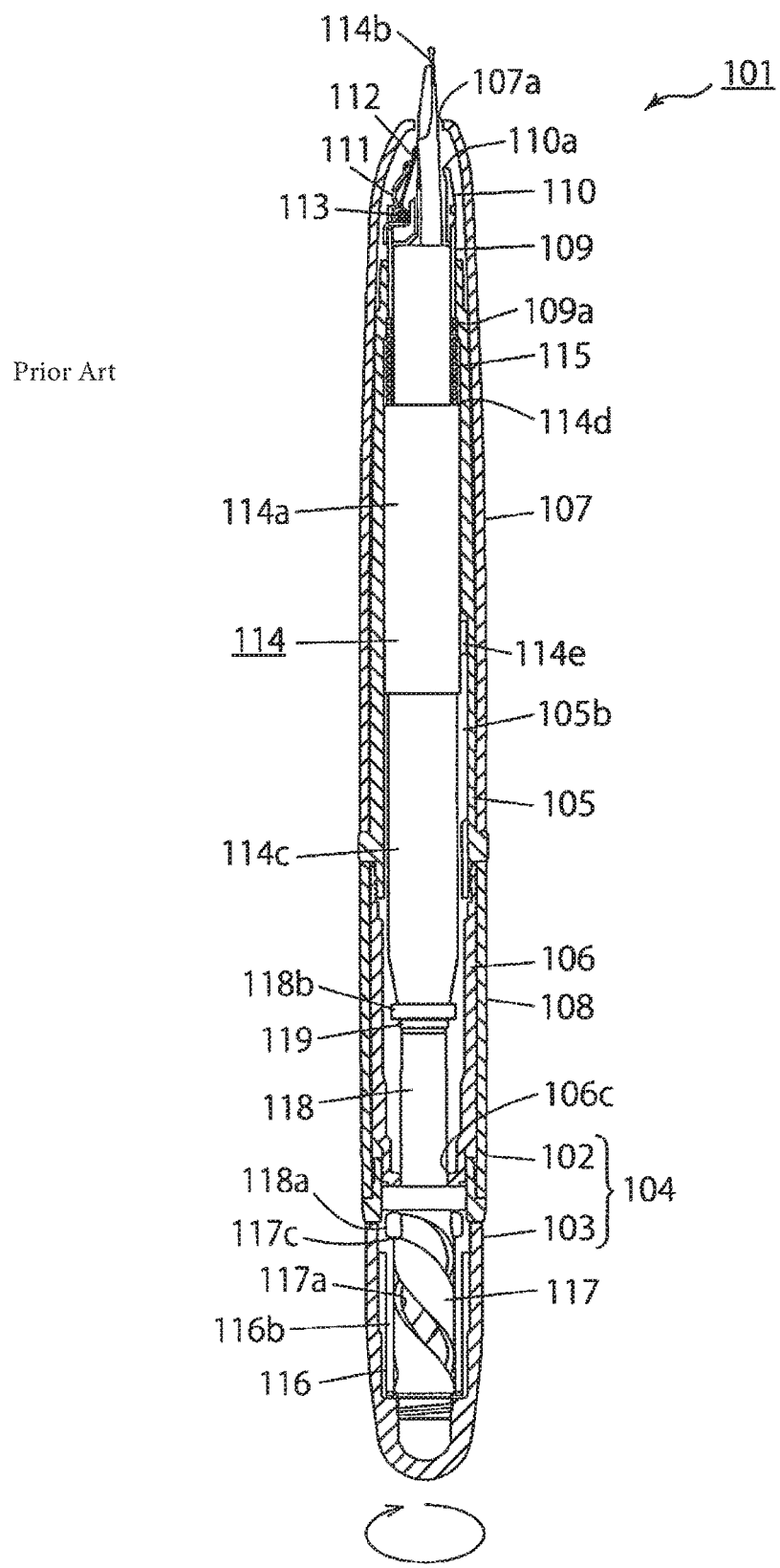
FIG. 10 is a schematic view showing the conventional rotating-operation type of writing tool of FIG. 9, under a situation wherein the writing body is protruded.

FIG. 4 is an explanatory view of an assembling step of the rear axial cylinder 3. FIG. 5 is an explanatory view of an assembling step of a nut 17n as the adjustment mechanism of rotational positions. FIG. 6 is an explanatory view of an assembling step of a rear-axial-cylinder inner cylinder 16. FIG. 7 is an explanatory view of an assembling step of a cam cylinder 17. FIG. 8 is an explanatory view of an assembling step of a slider 18. As shown in FIG. 4, a female threaded portion 2a is formed at a rear end portion of the front axial cylinder 2. A male screw portion 16a formed at a front end portion of the rear-axial-cylinder inner cylinder 16 (see FIG. 6) is threadedly mounted on the female threaded portion 2a (see FIG. 5).

A cam cylinder 17 having a spiral cam groove 17a is arranged in the rear-axial-cylinder inner cylinder 16 (see FIG. 6). A male screw portion 17s of the cam cylinder 17 is fitted in a positioning portion 3n of the rear axial cylinder 3 (for example, a concave portion that can be fitted on the convex portion of the nut 17n) via the nut having a convex portion 17n as the adjustment mechanism of rotational positions. Thereby, the cam cylinder 17 is rotatable integrally with the rear axial cylinder 3 (see FIGS. 4, 5 and 6).

The adjustment mechanism of rotational positions in the present embodiment has the male screw portion 17s fixed on the cam cylinder 17, and the nut having the convex portion 17n, which is threadedly engaged with the male screw portion 17s. The nut having the convex portion 17n has the convex portion at a portion in the outer circumference thereof. The rotational position (rotational phase) of the convex portion of the nut having the convex portion 17n can be adjusted precisely as desired, by adjusting the engagement position of the nut having the convex portion 17n with respect to the male screw portion 17s (for example, by not engaging the nut having the convex portion 17n with a root portion of the male screw portion 17s). Thus, as a result, the rotational position (rotational phase) of the rear axial cylinder 3 fixed on the cam cylinder 17 and the rotational position (rotational phase) of the front axial cylinder 2 fixed on the rear-axial-cylinder inner cylinder 16 can be adjusted precisely as desired.

A hollow body 18m, which has a hollow cylindrical shape and one opened end, is arranged in the cam cylinder 17 (see FIGS. 7 and 8). A hole for cam protrusion 18b, through which a cam protrusion 18a (for example, an insert pin: see FIG. 6) is inserted, is provided at a side surface of the hollow body 18m. The cam protrusion 18a that has been inserted through the hole for cam protrusion 18b is loosely fitted in the cam groove 17a, and also loosely fitted in a slit 16b formed on the rear axial cylinder 16 in a longitudinal direction thereof. In the present embodiment, two pairs of the cam groove 17a and the slit 16b are provided axisymmetrically, and two cam protrusions 18a are provided correspondingly to them (both ends of the insert pin are protruded).

As shown in FIG. 8, a coil spring 18c is inserted in the hollow body 18m of the slider 18. A flange body 18f is provided at the opened end of the hollow body 18 in such a manner that the coil spring 18c is a little compressed (in such a manner that a compressing load of about 100 gf is applied to the coil spring).

Specifically, the flange body 18f has a small flange portion 18s on an abutting side against the coil spring 18c. The small flange portion 18s is engaged with a long through hole 18h provided in the hollow body 18m so that the compressed state of the coil spring 18c is maintained. In addition, the small flange portion 18s is slidably movable within the long through hole 18h in a direction to further compress the coil spring 18c.

In addition, in the situation as shown in FIG. 1 wherein the writing body is contained, the cam protrusion 18a is not in contact with a rear end portion of the slit 16b, but a little away from the rear end portion. That is to say, the length of the slit 16b has a margin. Thus, it is easy to set the cam cylinder 17 into the rear-axial-cylinder inner cylinder 16 having the slit 16b under a condition wherein a further biasing force is given rearward. In the present embodiment, the cam protrusion 18a is in contact with the rear end portion of the cam groove 17a under a condition wherein no further biasing force is given. The initial load of the coil spring 18c is finally adjusted to about 100 gf, under the condition wherein the further biasing force is given.

A larger flange portion is provided on the flange body 18f at the end opposite to the small flange portion 18s. A rear end of an ink cartridge 14c of the writing body 14 is caused to abut on the large flange portion. An O-ring 19 made of a rubber is mounted on the larger flange portion.

The coil spring 15 always biases the flange body 18f rearward via the writing body 14 by means of a spring force greater than 100 gf, so that the O-ring 19 made of a rubber and mounted on the large flange portion of the flange body 18f is caused to abut on a jaw portion 3c formed on an inner surface of the rear axial cylinder 3 (see FIG. 1).

Thus, as shown in FIG. 1, under a situation in which the writing tip 14b has been caused to withdraw into the front axial cylinder 2, the lid 12 is closed so that the front portion of the front axial cylinder 2 assures airtightness, and the O-ring 19 abuts on the jaw portion 3c so that the rear portion of the front axial cylinder 2 assures airtightness. Thus, as a result, the inside space of the front axial cylinder 2 is closed sealingly.

Next, FIG. 2 shows a situation in which the writing tip 14b has been caused to protrude from the front axial cylinder 2.

When the rear axial cylinder 3 is rotated in a clockwise direction, the cam cylinder 17 is also rotated in the clockwise direction integrally, which creates a force to rotate in the clockwise direction the cam protrusion 18a loosely fitted into the cam groove 17a of the cam cylinder 17. Herein, the cam protrusion 18a is also loosely fitted into the slit 16b of the rear-axial-cylinder inner cylinder 16. Therefore, the cam protrusion 18a cannot be rotated in the clockwise direction. Instead, the cam protrusion 18a is slidably moved forward in the spiral cam groove 17a while being guided by the slit 16b.

Accordingly, the slider 18 is caused to move forward together with the cam protrusion 18a, so that the writing body 14 is also caused to move forward while compressing the coil spring 15, via the coil spring 18c and the flange body 18f. Subsequently, the writing tip 14b opens the lid 12.

After the writing tip 14b has protruded, the cam protrusion 18a of the slider 18 is held in a holding groove 17c (see FIG. 6) provided adjacently to the cam groove 17a. Thus, the protruding condition of the writing tip 14b is maintained. The holding groove 17c is formed in a manner to go back a little in the axial direction of the cam cylinder 17 from the front end of the spiral cam groove 17a. Thereby, when the cam protrusion 18a is biased rearward in the holding groove 17c by the coil spring 15, the cam protrusion 18a is caught.

When the rear axial cylinder 3 is rotated in the opposite direction (anticlockwise direction) from the situation shown in FIG. 2, the cam protrusion 18a of the slider 18 is released from the holding groove 17c of the cam cylinder 17. Subsequently, by means of the elastic force of the coil spring 15, via the flange body 18f and the coil spring 18c, the cam protrusion 18a is subjected to a force in a direction opposite to that when the cam protrusion 18a has moved forward. Thus, the cam protrusion 18a moves rearward in the cam groove 17a while giving an opposite rotating force to the cam groove 17a. The slider 18 also moves rearward, and thus the writing body 14 that is biased by the coil spring 15 moves rearward, too.

According to the above embodiment, the cam cylinder 17 and the rear axial cylinder 3 are fixed via the adjustment mechanism of rotational positions, i.e., via the fitting between the nut having the convex portion 17n and the positioning portion 3n that is a concave portion corresponding to the convex portion of the nut having the convex portion 17n. Thus, the design of the rear axial cylinder 3 and the design of the front axial cylinder 2 can be made continuous with each other without any difference between rotational positions (rotational phases) thereof, by adjusting the rotational positions (rotational phases) of the cam cylinder 17 and the rear axial cylinder 3, even when the front axial cylinder 2 and the rear-axial-cylinder inner cylinder 16 are threadedly engaged with each other so that it is difficult to adjust their fixed rotational positions (rotational phases).

According to the above embodiment, the design of the rear axial cylinder 3 and the design of the front axial cylinder 2 can be made continuous with each other very easily without any difference between rotational positions (rotational phases) thereof. Thus, as shown in FIG. 3, it is possible to adopt outrageous shapes, for example substantially triangle-pole shapes, as shapes for the front axial cylinder 2 and the rear axial cylinder 3.

Herein, the fixing manner between the convex portion of the nut having the convex portion 17n and the concave portion as the positioning portion 3n is not limited to the above fitting manner. Any other known engagement manner can be adopted, such as a snapping connection with the use of deformable elements. In addition, oppositely in convex and concave relationship, it is possible to use a nut having a concave portion, instead of the nut having the convex portion 17n, i.e., it is possible to adopt such a manner that the cam cylinder 17 and the rear axial cylinder 3 are fixed via the fitting (or another engagement manner) between the nut having the concave portion and the positioning portion 3n that is a convex portion corresponding to the concave portion of the nut having the concave portion.

In addition, according to the present embodiment, the airtightness performance is sufficiently achieved when the writing body 14 is caused to move rearward by the biasing force of the coil spring 15 so that the O-ring 19 of the slider 18 abuts on the jaw portion 3c.

Furthermore, according to the present embodiment, under the situation wherein the O-ring 19 abuts on the jaw portion 3c, the cam protrusion 18a and the hollow body 18m of the slider 18 are biased rearward by the coil spring 18c. Thus, the rear portion of the cam groove 17a is biased by the cam protrusion 18a. Thus, the rear axial cylinder 3 fixed to the cam cylinder 17 is inhibited from moving both in the rotational direction and in the front-rear direction. As a result, "backlash" of the rear axial cylinder 3 with respect to the front axial cylinder 2 is prevented very efficiently both in the rotational direction and in the front-rear direction.

DESCRIPTION OF THE SIGNS

1 Fountain pen
2 Front axial cylinder
2a Female threaded portion
3 Rear axial cylinder
3c Jaw portion
3n Positioning portion
11 Torsion coil spring
12 Lid
13 Axial rod
14 Writing body
14a Writing body base
14b Writing tip
14c Ink cartridge
15 Coil spring
16 Rear-axial-cylinder inner cylinder
16a Male screw portion
16b Slit
17 Cam cylinder
17a Cam groove
17n Nut having a convex portion (adjustment mechanism of rotational positions)
17s Male screw portion
18 Slider
18m Hollow body
18a Cam protrusion
18b Hole for cam protrusion
18c Coil spring
18f Flange body
18h Long through hole
18s Small flange portion
19 O-ring

The invention claimed is:

1. A rotating-operation type of writing tool in which a tip portion of the writing tool is caused to protrude from a front portion of a front axial cylinder by a rotating operation of a rear axial cylinder with respect to the front axial cylinder, comprising:
a front axial cylinder and a rear axial cylinder which are separable from each other;
a rear-axial-cylinder inner cylinder provided in the rear axial cylinder and fixed to a rear portion of the front axial cylinder, the rear-axial-cylinder inner cylinder having a slit in a longitudinal direction thereof;
a cam cylinder provided in the rear-axial-cylinder inner cylinder and fixed to the rear axial cylinder, the cam cylinder having a spiral cam groove;
a cam protrusion loosely fitted into the cam groove of the cam cylinder and the slit of the rear-axial-cylinder inner cylinder;
a slider provided in the cam cylinder, the slider being movable in the cam cylinder integrally with the cam protrusion; and
a writing body provided in the front axial cylinder, the writing body being biased rearward by a biasing member relative to the front axial cylinder;
wherein
the slider is also biased rearward via the writing body by the biasing member;
when the rear axial cylinder is rotated, the cam cylinder is rotated, thereby the cam protrusion moves forward by means of the cam groove and the slit, so that the slider moves forward to cause the writing body to move forward against a biasing force by the biasing member, and
the cam cylinder and the rear axial cylinder are fixed via an adjustment mechanism of rotational positions.

2. The rotating-operation type of writing tool according to claim 1, wherein
the adjustment mechanism of rotational positions includes:
a nut having a convex portion whose rotational position is adjustably fixed on the cam cylinder; and
a positioning portion provided on the rear axial cylinder, configured to be fitted on the convex portion of the nut.

3. The rotating-operation type of writing tool according to claim 1, wherein
the adjustment mechanism of rotational positions includes:
a nut having a concave portion whose rotational position is adjustably fixed on the cam cylinder; and
a positioning portion provided on the rear axial cylinder, configured to be fitted into the concave portion of the nut.

4. The rotating-operation type of writing tool according to claim 2, wherein
the adjustment mechanism of rotational positions has a male screw portion fixed on the cam cylinder, and
the rotational position of the nut is adjustably fixed on the male screw portion.

5. The rotating-operation type of writing tool according to claim 1, wherein
the rear portion of the front axial cylinder and the rear-axial-cylinder inner cylinder are threadedly engaged with each other.

6. The rotating-operation type of writing tool according to claim 1, wherein
the front axial cylinder and the rear axial cylinder have substantially triangle-pole shapes.

* * * * *